US008780893B2

(12) United States Patent
O'Brien, Jr. et al.

(10) Patent No.: US 8,780,893 B2
(45) Date of Patent: *Jul. 15, 2014

(54) VOICE OVER INTERNET PROTOCOL REAL TIME PROTOCOL ROUTING

(71) Applicant: Level 3 Communication, LLC, Broomfield, CO (US)

(72) Inventors: James D. O'Brien, Jr., Burlington, MA (US); Elliot Eichen, Burlington, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/765,582

(22) Filed: Feb. 12, 2013

(65) Prior Publication Data

US 2013/0163587 A1 Jun. 27, 2013

Related U.S. Application Data

(63) Continuation of application No. 12/060,680, filed on Apr. 1, 2008, now Pat. No. 8,374,167, which is a continuation of application No. 09/878,572, filed on Jun. 11, 2001, now Pat. No. 7,369,535.

(51) Int. Cl.
*H04L 12/66* (2006.01)
*H04L 12/28* (2006.01)

(52) U.S. Cl.
USPC .......................................... 370/352; 370/410

(58) Field of Classification Search
USPC .................. 370/352, 356, 401, 410
See application file for complete search history.

(56) References Cited

U.S. PATENT DOCUMENTS

| | | | |
|---|---|---|---|
| 6,118,985 A | 9/2000 | Kawakyu | |
| 6,360,265 B1 | 3/2002 | Falck et al. | |
| 6,466,977 B1 | 10/2002 | Sitaraman et al. | |
| 6,480,508 B1 | 11/2002 | Mwikalo et al. | |
| 6,480,898 B1 | 11/2002 | Scott et al. | |
| 6,510,509 B1 | 1/2003 | Chopra et al. | |
| 6,577,648 B1 | 6/2003 | Raisanen et al. | |
| 6,614,781 B1 | 9/2003 | Elliott et al. | |
| 6,654,348 B1 | 11/2003 | Doty | |
| 6,674,758 B2 | 1/2004 | Watson | |
| 6,687,245 B2 | 2/2004 | Fangman et al. | |
| 6,718,359 B2 | 4/2004 | Zisapel et al. | |
| 6,757,294 B1 | 6/2004 | Maruyama | |
| 6,765,927 B1 | 7/2004 | Martin et al. | |
| 6,766,377 B1 | 7/2004 | Grabelsky et al. | |
| 6,798,751 B1 | 9/2004 | Voit et al. | |
| 6,822,957 B1 | 11/2004 | Schuster et al. | |
| 6,829,250 B2 | 12/2004 | Voit et al. | |
| 6,922,786 B1 | 7/2005 | Ong | |
| 6,965,562 B2 | 11/2005 | Tuomi | |

(Continued)

OTHER PUBLICATIONS

"Radivision—Gatekeeper:", Web Proforum Tutorials, http://www.iec.org, *The International Engineering Consortium*, (no date available), , 1-15.

(Continued)

*Primary Examiner* — Andrew Lee

(57) ABSTRACT

A method for call signaling and media flow in a network including receiving call signaling information from an originating Voice over Internet Protocol (VoIP) endpoint relaying the call signaling information to a destination VoIP endpoint, directing the originating VoIP endpoint to use a RTP media proxy and receiving a stream of media to the RTP media proxy from the originating VoIP endpoint.

12 Claims, 2 Drawing Sheets

(56) References Cited

U.S. PATENT DOCUMENTS

| | | |
|---|---|---|
| 6,973,042 B1 | 12/2005 | Fitzgerald |
| 7,047,561 B1 | 5/2006 | Lee |
| 7,539,179 B1 | 5/2009 | Baird et al. |
| 7,831,730 B1 | 11/2010 | Markowitz et al. |
| 8,374,167 B2 | 2/2013 | O'Brien, Jr. et al. |
| 2002/0044547 A1 | 4/2002 | Dalton, Jr. et al. |

OTHER PUBLICATIONS

"Telica—Accelerating the Deployment of VoIP and VoATM", Web ProForum Tutorials, http://www.iec.org, *The International Engineering Consortium*, (no date available), 1-21.

VOICE OVER INTERNET PROTOCOL REAL TIME PROTOCOL ROUTING

CROSS REFERENCE TO RELATED APPLICATIONS

This application is a continuation of and claims priority to U.S. patent application Ser. No. 12/060,680 entitled "VOICE OVER INTERNET PROTOCOL REAL TIME PROTOCOL ROUTING", filed on Apr. 1, 2008, which is a continuation of U.S. patent application Ser. No. 09/878,572 entitled "VOICE OVER INTERNET PROTOCOL REAL TIME PROTOCOL ROUTING", filed on Jun. 11, 2001, both of which are hereby incorporated by reference herein.

FIELD OF INVENTION

This invention relates to voice over Internet protocol (VoIP) real time protocol (RTP) routing.

BACKGROUND

Internet telephony, also known as voice-over-IP telephony or IP telephony, typically includes the real-time delivery of voice (and possibly other multimedia data types) on a network using Internet protocols and the exchange of information required to control this delivery. The delivery of stored ("streaming") media content and telephone-style applications can use almost all of the underlying protocol infrastructure of the Internet. In the Internet, the Real Time Transport Protocol (RTTP) is used for real-time flows such as voice and video streams. Voice signals are digitized, compressed and converted to IP packets and transmitted over an IP network. Signaling protocols are used to set up and terminate calls, carry information required to locate users, and negotiate capabilities.

SUMMARY

An embodiment of the invention features a method of Voice over Internet Protocol (VoIP) Real Time Protocol (RTP) routing in a network including forcing packets carrying media in a VoIP call through network elements of a specific IP address having call signaling and selected RTP media proxy.

Embodiments of the invention may have one or more of the following features:

The packets may originate in an originating VoIP network endpoint. The packets may use the RTP protocol. Forcing may include receiving call signaling information from an originating VoIP network endpoint in the call signal proxy, relaying the call signaling information through the call signaling proxy to a destination VoIP network element, directing the originating VoIP network endpoint to use the selected RTP media proxy server, streaming the packets to a media proxy in the selected RTP media proxy server and replacing an IP address of the media proxy and the call signaling proxy with an address of a next hop in the network. Replacing can include Network Address Translation (NAT). The next hop can be a terminating VoIP network endpoint. The RTP media proxy includes a list of static, virtual or dynamic IP addresses that represent media network endpoints, gateways and other media proxies. NAT can hide the terminating VoIP network endpoint from a call originator and an originating VoIP network endpoint address from a terminating VoIP network endpoint address. Relaying may include selecting call signaling and media proxies that provide the best quality of service by testing a quality of a network connection from the originating VoIP network endpoint point of presence (POP) to each of the call signaling and media proxies.

An embodiment of the invention features a method for call signaling and media flow in a network including receiving call signaling information from an originating Voice over Internet Protocol (VoIP) endpoint, relaying the call signaling information to a destination VoIP endpoint, directing the originating VoIP endpoint to use a RTP media proxy and receiving a stream of media to the RTP media proxy from the originating VoIP endpoint.

Embodiments of the invention may have one or more of the following features:

Directing may include determining an address of the destination VoIP endpoint and obtaining virtual addresses from the RTP media proxy server. The virtual addresses may represent media endpoints, gateways and other media proxies.

An embodiment of the invention features a method for controlling RTP routing including sending call signaling information from an originating VoIP endpoint to a call signaling proxy, relaying the call signaling information from the call signaling proxy to a destination VoIP endpoint and sending a stream of media from the originating VoIP endpoint to a RTP media proxy.

Embodiments of the invention may have one or more of the following features:

The RTP media proxy may include virtual IP addresses of media endpoints, media gateways and other RTP media proxies.

The method may further include replacing an IP address of the call signaling proxy and the RTP media proxy with an IP address of a next hop endpoint. Replacing may include network address translation (NAT).

Embodiments of the invention may have one or more of the following advantages:

The quality of a VoIP call is insured by controlling the path of the media stream to ensure that these voice packets traverse a known, and presumably managed, IP network. The path of the voice packets can avoid congested networks or peering points.

Since packets corresponding to voice calls in both directions can be forced through specific network elements, network address translation (NAT) can be used to hide a terminating VoIP gateway's IP address from the call originator (e.g., PC client), and similarly hide the originator's VoIP gateway IP address from the call terminator. This allows VoIP network providers to use networks other than their own to terminate calls without revealing this, or any network details, to either call originator or call terminator. This prevents network users or carriers from bypassing this "facilitator" network.

Originating VoIP endpoints can select call signaling and media proxies that provide the best quality of service (QoS) for their calls by testing the quality of the network connection from their point of presence (POP) to each of the call signaling and media proxies. This selection process provides the originating VoIP endpoints with the best path to the managed VoIP network.

The call signaling and media proxy server allows voice media traffic between a VoIP PC client and a wholesale Internet telephony service provider VoIP gateway to remain on the wholesale Internet telephony service providers VoIP network for the longest possible portion of its travel. The call signaling and media proxy server also allows voice traffic of directly connected gateway customers to remain on the wholesale Internet telephony service provider VoIP network, even if the voice traffic is destined for a termination partner.

VoIP service providers can use the call signaling and media proxy server as a way to control how calls are sent to their partners who terminate calls for them using VoIP connections. This control allows Internet telephony providers to manage the quality of calls that may not terminate on equipment that they own by being able to direct voice traffic to locations on their network and then direct the voice streams to their termination partners.

Other features and advantages of the invention will be apparent from the description, and from the claims.

DETAILED DESCRIPTION

Figure 1:
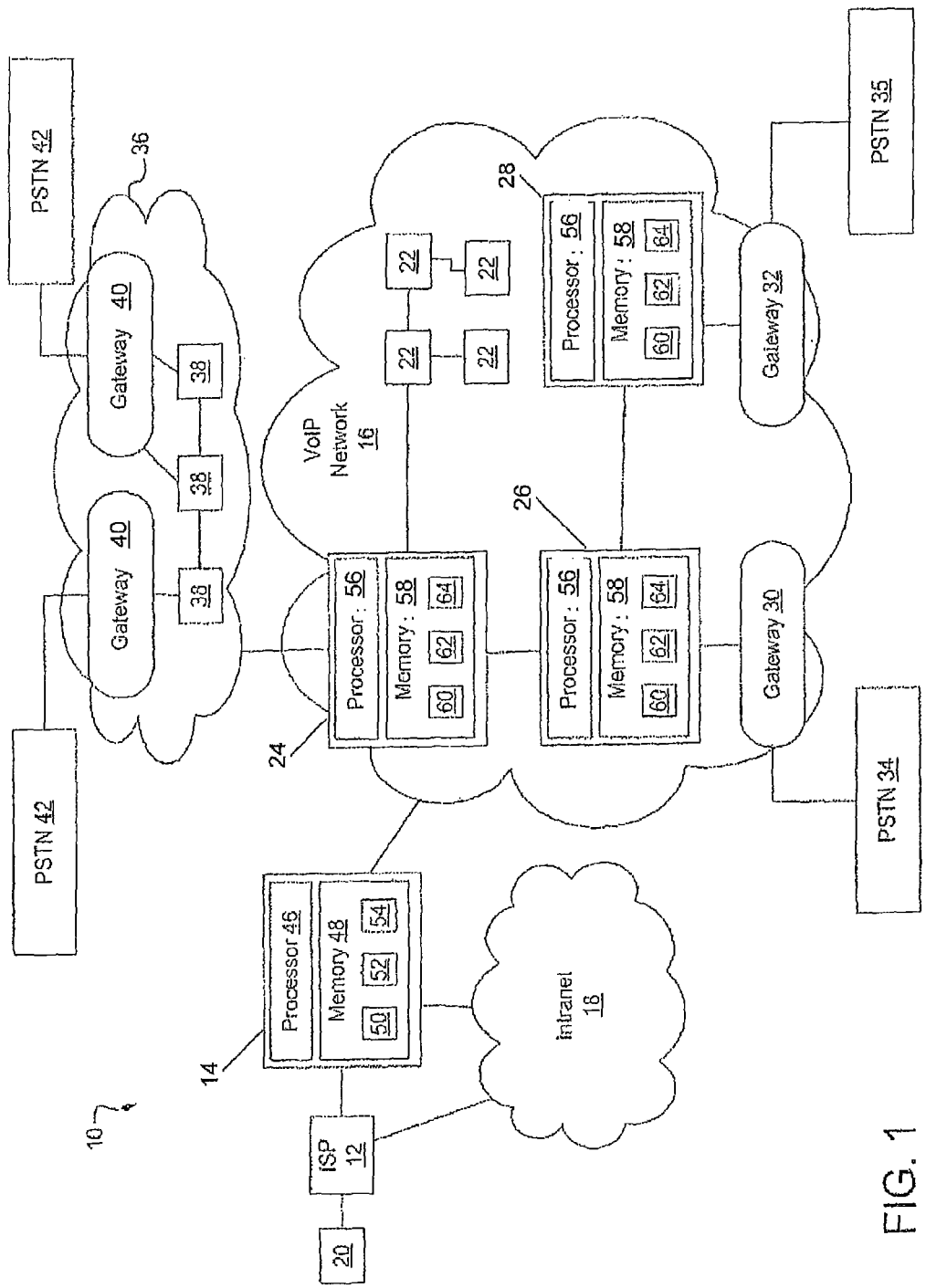
FIG. 1 is a block diagram of an Internet telephony network.

Referring to FIG. 1, an exemplary Internet telephony network 10 includes an Internet Service Provider (ISP) 12, a retail Voice over Internet Protocol (VoIP) system 14, and a VoIP network 16. The ISP 12 may have a direct link to the retail VoIP system 14 or a link to the retail VoIP system 14 through the Internet 18. A client personal computer (PC) system 20 is linked to the ISP 12 and can gain access to the retail VoIP system 14. The retail VoIP system 14 is directly linked to the VoIP network 16.

The PC system 20 is used for real-time bi-directional multi-media communications. The PC system 20 supports audio communications and can optionally support video or data communications.

The VoIP network 16 includes a collection of interconnected computer systems generally labeled 22, and one or more call signaling and media proxy servers 24, 26 and 28. The VoIP network 16 also includes one or more telephony gateways 30 and 32. Each telephony gateway 30 and 32 is connected to a respective Public Service Telephone Network (PSTN) 34 and 35. PSTN 34 and 35 provide access to a traditional telephone network (not shown) terminating at an end user telephone set.

A gateway connects two dissimilar networks, typically by translating protocols for call setup and release, converting media formats between different networks, and transferring information between the networks connected to the gateway.

In some examples, the call signaling and media proxy server 24 is linked to a second VoIP network 36. The second VoIP network 36 includes systems 38 connected to gateways 40 that provide access to PSTNs 42.

The VoIP network 16 (and VoIP network 36) is optimized for Voice over Internet telephony (also known as Internet telephony or IP telephony). For example, the VoIP network 16 provides a path for voice packets that avoid congestion and peering points.

Each call signaling and media proxy server 24, for example, is configured to allow voice media traffic between the client PC system 20 and a telephony gateway 30, for example, to remain on the VoIP network 16 for the longest possible portion of its travel. The call signaling and media proxy server 24 is also configured to allow voice media traffic originating from the telephony gateway 30 to remain on the VoIP network 16 longer even if the voice media traffic is routed to the second VoIP network 36. Media proxies are set up at network interconnection points, or geographic areas, or otherwise strategic/logical points within a network that allow media to be steered to and from customers and to and from vendors.

The retail VoIP system 14 includes a processor 46 and a memory 48. The memory 48 stores machine executable instructions 50, an operating system 52 and a TCP/IP protocol stack 54. Instructions 50 are executed by processor 46 to perform a selection process 44.

Each of the call signaling and RTP media proxy servers 24, 26 and 28 include a processor 56 and a memory 58. The memory 58 stores machine-executable instructions 60, an operating system 62 and a TCP/IP protocol stack 64. Instructions 60 are executed by the processor 56 to perform a VoIP process 100.

Figure 2:
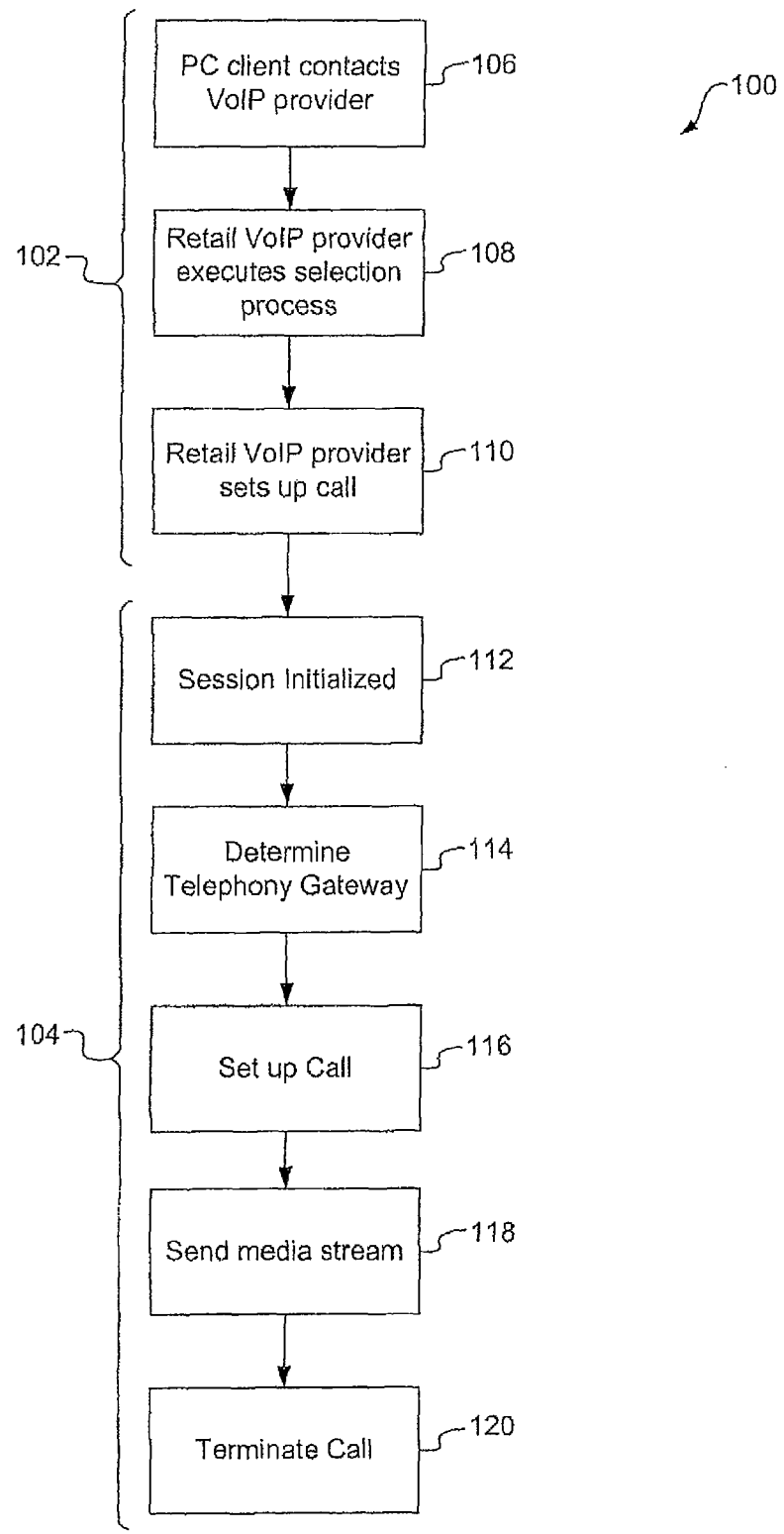
FIG. 2 is a flow diagram of a VoIP process.

When a user (not shown) of the PC client system 20 wishes to make a telephone call to an end user connected to a PSTN, the call is handled by an Internet telephony gateway, telephony gateway 30, for example. Referring now to FIG. 2, a VoIP process 100 includes a server selection process 102 and an implementation process 104. The server selection process 102 includes the PC client system 20 contacting (106) the retail VoIP system 14 through the ISP 12 to initiate a call. The retail VoIP system 14 executes (108) a selection process 44 to detect the closest call signaling and media proxy server residing in the VoIP network 16 to the PC client system 20.

The selection process 44 may be implemented using one of several methods. For example, the selection process 44 may use a series of pings or trace routes to determine which call signaling and media proxy server residing in the VoIP network 16 represents the closest, or shortest, path, or which call signaling and media proxy server has the most reliable connection. The detected path usually represents the shortest path between the PC client system 20 and the VoIP network 16 and not the shortest path between the retail VoIP system 14 and the VoIP network 16 (although both paths may be the same in some instances).

Once the closest call signaling and media proxy server has been selected, the retail VoIP computer system 14 sets up (100) the call using an associated call signaling proxy. A call is broadly defined as an association between a number of participants. A signaling association between a pair of participants is referred to as a connection. There are no physical channel or network resources associated with a connection; the connection exists only as signaling state at the two end points. A session generally refers to a single Real Time Transport Protocol (RTP) session carrying a single media type. Call signaling is used to establish the connection between two endpoints. This connection is typically achieved by exchanging protocol messages on a call-signaling channel. The call-signaling channel is opened between two endpoints.

In the implementation process 104 a session is initiated (112) utilizing the Session Initiation Protocol (SIP). SIP is a client-server protocol in which requests are generated by one entity (the client PC 20, for example), and sent to a receiving entity (call signaling and media proxy server 24, for example). SIP requests can transverse many call signaling and media proxy servers, each of which receives a request and forwards it towards a next hop server, which may be another call signaling and media proxy server or the end user.

The call signaling proxy can be designed to use in a call signaling and media proxy server or in a set of call signaling and media proxies servers that have been selected as closest to the client PC 20 because that is where the media originates, unless the media is brought through the retail VoIP system 14. Typically media flows directly from the client PC 20 to the VoIP network 16 and not through the retail VoIP system 14. The call signaling proxy also acts as an entry point into a least cost routing mechanism of the VoIP network 16. A destination telephony gateway is determined (114) for the call. Once a destination telephony gateway, telephony gateway 30 for example, is determined (114) for the call, the call signaling proxy sets up a (116) call to the gateway 30. The call signaling proxy will instruct the retail VoIP system 14 to send (118) PC client 20 media streams to a particular Internet Protocol (IP) address and port associated with a media proxy within the call signaling and media proxy server. The call signaling proxy also instructs the telephony gateway 30 to send its media stream to a particular IP address and port associated with the media proxy. Once the media stream is complete, the call is terminated (120).

The media proxy may use the network address translation (NAT) or a similar mechanism to change the destination IP addresses on the RTP packets that travel between the destination telephony gateway 30 and the PC client system 20. To enable this network address translation, the call signaling and media proxy server has an interface where the call signaling proxy defines virtual sets of IP addresses and ports assigned to the destination gateways and to the PC client systems. The network address translation executes in real time as the actual RTP IP addresses of the telephony gateway and PC client system are made available only during the call setup process.

In another example, the VoIP network 16 uses a call signaling and media proxy server to control how calls are sent to partners, e.g., the second VoIP network 36, who terminate calls for the VoIP network 16 using VoIP inter-connections. Control by the call signaling and media proxy server allows the VoIP network 16 to manage the quality of calls that may not terminate on systems within the VoIP network 16 by directing RTP media traffic streams to locations on VoIP network 16 and then directing RTP media traffic streams to the VoIP network 36.

Customers, e.g., the retail VoIP system 14, that have direct connections to the VoIP network 16 expect a higher quality of service (QoS) than PC to phone calling or a customer 14 using open internet connection to transport his VoIP call signaling and media streams. When the VoIP network 16 chooses to send calls to one of his partners, e.g., the second VoIP network 36, for termination, there is a desire to ensure that customer's RTP media is handled as if the telephony gateway 40 is part of the VoIP network 16 and not part of the second VoIP network 36. Because both the customer 14 and the VoIP network 36 may have other Internet connections (not shown) that are unmanaged, a media proxy is used to route RTP media for calls provided by the VoIP network 16 over their managed network. Customers 14 that are directly connected to the VoIP network 16 and have fixed locations are routed directly to telephony gateways in the network 16 or to media proxies that serve individual terminating partners.

In another example, Interactive Sharing Transfer Protocol (ISTP) carriers or their PC to phone customers who use ISTP networks for transport and termination may want to improve the voice quality for customers using certain ISPs for connectivity while using their PC to phone VoIP service. An ISP may also be a PC to phone provider and want better connection to its customers to the VoIP network 16. By using a call signaling and media proxy server that has direct connections to an ISP network, a peer to peer relationship can be set up for VoIP traffic alone. When an ITSP carrier and an ISP peer only advertise the IP addresses of a group of call signaling and media proxy servers to the ISP's network, this connection can be used for VoIP traffic only. In this manner the VoIP call signaling and media streams will avoid the ISP's normal peering connections and use the dedicated VoIP peering connection. This allows the ISP and ITSP carrier to better manage the PC to phone traffic and QoS.

Processes 44 and 100 are not limited to use with the hardware/software configuration of FIG. 1; they may find applicability in any computing or processing environment. Processes 44 and 100 may be implemented in hardware (e.g., an ASIC {Application-Specific Integrated Circuit} and/or an FPGA {Field Programmable Gate Array}), software, or a combination of hardware and software.

Processes 44 and 100 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage mechanism or device (e.g., CD-ROM, hard disk, or magnetic disk) that is readable by a general or special purpose programmable computer for configuring and operating the computer when the storage mechanism or device is read by the computer to perform processes 44 and 100.

Processes 44 and 100 may also be implemented as a computer-readable storage medium, configured with a computer program, where, upon execution, instructions in the computer program caused the computer to operate in accordance with process 44 and 100.

A number of embodiments of the invention have been described. Nevertheless, it will be understood that various modifications may be made without departing from the spirit and scope of the invention. Accordingly, other embodiments are within the scope of the following claims.

The invention claimed is:

1. In a Voice over Internet Protocol (VOIP) network comprising a plurality of call signaling and media proxy servers and a plurality of telephony gateways, wherein each of the plurality of telephony gateways is communicatively connected to one or more telephony networks separate from the VOIP network, a method comprising:
   in response to initiation of a VOIP call by an originating VOIP device,
   (a) selecting a particular telephony gateway of the plurality of telephone gateways to handle transmission of the VOIP call to a separate telephony network;
   (b) instructing a particular telephony gateway of the plurality of telephony gateways to send media packets associated with the VoIP call to a specific Internet Protocol (IP) address and port assigned to a particular call signaling and media proxy server of the plurality of call signaling and media proxy servers; and
   (c) by the particular call signaling and media proxy server,
      (1) receiving media packets from the particular telephony gateway, wherein the media packets are associated with the VOIP call;
      (2) modifying IP address information contained in said media packets; and
      (3) sending said modified media packets to the originating VOIP device.

2. A method as recited in claim 1, wherein said modifying act (c)(2) is performed, at least in part, using a network address translation mechanism.

3. A method as recited in claim 1, wherein the method further comprises:
   (d) by the particular call signaling and media proxy server,
      (1) receiving media packets from the originating VOIP device, wherein the media packets are associated with the VOIP call;

(2) modifying IP address information contained in said media packets; and
(3) sending said modified media packets to the particular telephony gateway.

4. A method as recited in claim 3, wherein said modifying act (d)(2) is performed, at least in part, using a network address translation mechanism.

5. A method as recited in claim 1, wherein the media packets comprise Real Time Protocol (RTP) packets.

6. A method as recited in claim 1, wherein the separate telephony network comprises a public switched telephone network.

7. In a Voice over Internet Protocol (VOIP) network comprising a plurality of call signaling and media proxy servers and a plurality of telephony gateways, wherein each of the plurality of telephony gateways is communicatively connected to one or more telephony networks separate from the VOIP network, a method comprising:
in response to initiation of a VOIP call by an originating VOIP device,
(a) selecting a particular telephony gateway of the plurality of telephone gateways to handle transmission of the VOIP call to a separate telephony network;
(b) instructing the originating VOIP device to send media packets associated with a VoIP call to a specific Internet Protocol (IP) address and port assigned to a particular call signaling and media proxy server of the plurality of call signaling and media proxy servers; and
(c) by the particular call signaling and media proxy server,
(1) receiving media packets from the originating VOIP device, wherein the media packets are associated with the VOIP call;
(2) modifying IP address information contained in said media packets; and
(3) sending said modified media packets to the particular telephony gateway.

8. A method as recited in claim 7, wherein said modifying act (c)(2) is performed, at least in part, using a network address translation mechanism.

9. A method as recited in claim 7, wherein the method further comprises:
(d) by the particular call signaling and media proxy server,
(1) receiving media packets from the particular telephony gateway, wherein the media packets are associated with the VOIP call;
(2) modifying IP address information contained in said media packets; and
(3) sending said modified media packets to the originating VOIP device.

10. A method as recited in claim 9, wherein said modifying act (d)(2) is performed, at least in part, using a network address translation mechanism.

11. A method as recited in claim 7, wherein the media packets comprise Real Time Protocol (RTP) packets.

12. A method as recited in claim 7, wherein the separate telephony network comprises a public switched telephone network.

* * * * *